United States Patent
Ohba et al.

[19]

[11] Patent Number: 5,913,225
[45] Date of Patent: Jun. 15, 1999

[54] CACHE FLUSH MECHANISM FOR A SECONDARY CACHE MEMORY

[75] Inventors: Nobuyuki Ohba, Sendai; Takeo Nakada, Saitama-ken, both of Japan

[73] Assignee: International Business Machines Corporation, Armonk, N.Y.

[21] Appl. No.: 08/776,742

[22] PCT Filed: Jun. 8, 1995

[86] PCT No.: PCT/JP95/01162

§ 371 Date: Feb. 7, 1997

§ 102(e) Date: Feb. 7, 1997

[87] PCT Pub. No.: WO96/42056

PCT Pub. Date: Dec. 27, 1996

[51] Int. Cl.⁶ .................................................. G06F 12/12
[52] U.S. Cl. ........................................ 711/135; 711/134
[58] Field of Search .................................. 711/135, 159, 711/134, 133

[56] References Cited

U.S. PATENT DOCUMENTS

| | | | |
|---|---|---|---|
| 5,408,636 | 4/1995 | Santeler et al. | 711/163 |
| 5,475,829 | 12/1995 | Thome | 711/152 |
| 5,544,344 | 8/1996 | Frame | 711/156 |
| 5,581,727 | 12/1996 | Collins et al. | 711/135 |
| 5,638,532 | 6/1997 | Frame et al. | 711/154 |

*Primary Examiner*—Eddie P. Chan
*Assistant Examiner*—Gary J. Portka
*Attorney, Agent, or Firm*—Daniel E. McConnell; Anthony N. Magistrale

[57] ABSTRACT

An effective mechanism for cache flushing that can be applied to a memory system operated in dual-mode is disclosed. The dual-mode is composed of two modes using two physically distinguished main memory spaces respectively at a common logical address in at least a portion of the whole address area. The interruption of the signal (SMIACT#) that represents the switching of the mode by secondary cache is provided. When SMIACT# is generated by CPU and it is detected by the system core, the system core switches the memory bank for the cache memory to write back, resulting in violating memory consistency between the cache and main memory. This invention keeps the SMIACT# from reaching the system core before the cache flushing is over, assuring the content of the cache memory to be written back to a correct memory bank where the data originally resided, since the system core believes that the mode has not yet been switched though the CPU actually generated SMIACT#.

9 Claims, 5 Drawing Sheets

CACHE FLUSH MECHANISM FOR A SECONDARY CACHE MEMORY

TECHNICAL FIELD

The present invention relates to a mechanism for cache flushing hardware for PCs having secondary cache. Particularly, this mechanism is well applicable to a system having plurality of modes, using plurality of address system for the memory location.

BACKGROUND

A CPU has a signal input named FLUSH# for flushing the internal cache system. The FLUSH# signal, when it is driven low by the system core, which controls and manages accessing to the memory, the CPU is forced to flush the entire contents of the on-chip cache. The CPU system is usually made up of a few components other than the CPU itself, for example, a main memory to store information and being accessed by the CPU to derive the data stored therein, a first cache memory which resides between the CPU and the main memory and provides a relatively very fast access to a required data and storing a flick portion of data which is occasionally accessed by the CPU and is duplicatedly stored in the main memory, and preferably a second cache which resides between the first cache memory and the main memory, which is not as fast as the first cache memory, but has an ability to store more data. The second cache memory also has a signal input line named FLUSH#, having similar purpose and function.

There are two ways for data write handling between the CPU and the secondary cache. One is write-through operation, which writes data to secondary cache and the main memory at the same time even if the CPU wanted the data to be written only into the secondary cache. The other is write-back operation, which only writes the data to the secondary cache when the CPU wanted the data to be written only into the secondary cache. In other words, there will be no back-up data in main memory in the case of write-back operation. As is easily imagined, the write-back operation is more efficient in view of data transfer, but it has a disadvantage that the contents of the secondary cache have to be transferred or "write-back" to the main memory at the occasion of cache flush for back-up purpose.

These components of the system are being connected by a common data transfer line called a CPU bus. Since the bus is common to all the components of the system, an access conflict may occur in the case of starting write-back cycles in response to FLUSH# signal. Therefore, an arbitration mechanism is needed to avoid this conflict. Before writing back the modified lines, the secondary cache must obtain ownership of the CPU bus in order to start write back cycle.

The CPU system typically mentioned herewith is shown in FIG. 1. In this figure, the first cache is included within the CPU and is not shown. The main memory is supposed to be connected to the secondary cache, but it is also not shown. The secondary cache is connected to both of the CPU and the system core by FLUSH#. The system core is a component which controls the input/output operation between the CPU, the secondary cache and the main memory. The FLUSH# provides the request to flush the first and secondary cache from the system core to the CPU. The CPU and the system core is connected via HOLD and HLDA. The HOLD is driven when the system core requests the CPU to release the bus. In turn, the CPU releases the bus after it has finished with the current tasks using bus, asserts HLDA# through HLDA to inform of the fact that the bus has been released.

However, the secondary cache cannot obtain the ownership of the bus by itself in this system, since it can not transfer a signal to obtain the bus to the CPU nor the system core. This results into a conclusion that write-back operation can not be achieved in this system, because in order to achieve write-back operation, the secondary cache has to intensively obtain the ownership of the bus prior to starting write-back cycles.

This is the primary problem in the prior art. To solve this problem, BOFF# lines is added to the system. This line connects the secondary cache to the CPU, and when this is asserted, the CPU will instantly release the bus line, in turn the secondary cache obtains the ownership of the bus at the next CPU cycle. BOFF# forces the CPU to abort the current task and regenerate it later on from the first. However, this method may cause a problem if the secondary cache asserts BOFF# line while the CPU is working in a history sensitive manner. For example, if CPU is in a I/O cycle, the CPU should not cease its operation to release the bus because releasing bus in the midst of I/O operation, e.g. data transfer, will cause an inconsistency of the data, and even if the cycle is regenerated later, the inconsistency may not be recovered. It should be also noted that it is not possible for the secondary cache to detect whether the CPU is working in a history sensitive manner or not, nor selectively assert BOFF# in the timing window in which the CPU is not working in history sensitive manner.

Another way for obtaining the bus ownership for the secondary cache is to assert BOFF# when the CPU generates a dummy I/O cycle as shown in a document "Look-Aside Store In Cache Functional Specification, by Phil Milling and Jorge Lenta, Preliminary revision 1.1 (Jan, '93)". This method will solve the problem caused in the first way, since the secondary cache will go into the flush pending state when it detects the system core asserting FLUSH#. In this pending state, the secondary cache waits for a dummy I/O cycle, which the CPU is assumed to generate later. However, in this method, the flush cycle must be initiated by the CPU since the CPU has to generate the dummy I/O cycle, actually being stimulated by a system program. The program here is that it can not be applied to a system in which the system core initiates the flush.

One alternative for this method is to assert BOFF# when the CPU generates a flush acknowledge cycle. This method is, when the secondary cache detects the system core asserting FLUSH#, the secondary cache goes into the flush pending state and waits for the flush acknowledge cycle, which the CPU generates after it has completed the on-chip cache flush. But this method is inoperable to the type of the CPU that does not generates the flush acknowledge cycle. Actually, very limited types of the CPU generates flush acknowledge cycle, which implies that this method is not commonly processed in various systems.

Recently, many CPUs used in a personal computer (PC) system are applying a dual-mode memory management for application-transparent system services, such as power saving facility. For example, Intel x86 CPU chip adopts a mode which utilizes two apparently distinct memory systems having a common unique address for at least a portion of the entire address region. This means that a specific address corresponds to two different physical locations and either one of the two different physical location is defined by detecting the current mode of which the system runs. This additional mode is usually called a "system management mode" which is often abbreviated as SMM, on the contrary to the standard mode. When the system has to get into the SMM, the system core will interrupt normal program execution and invoke the SMM by generating a System Management Interrupt (SMI#) request to the CPU.

This dual mode system is schematically shown in FIG. 7. In this system, the operation is made in two modes of standard mode and system management mode, which is defined by SMIACT# generated by the CPU. For example, when the SMIACT# is driven high, the whole system is operated in the standard mode, which means that memory access will be made to standard RAM. In turn, when the SMIACT# is driven low, the whole system goes into the SMM, which means that memory access can be possibly made to the SMRAM. It should be noted, that in this FIG. 7, SMRAM exist in the range of logical address of 1000 to 2000, so an access to the address within this range will be made to the SMRAM and an access to the other memory address will be made to standard RAM, even if the whole system was operated in the SMM.

SMRAM is a physical memory dedicated for use by CPU while in the SMM, and having size of 32 KB to 4 GB, containing SMM handler codes, relevant system specific SMM data, and the processor state information representing the processor state prior to entering into the SMM. When the CPU enters into the SMM, it asserts SMIACT# low thus alerting the system core to switch into SMRAM space. The CPU then stores its current register state information into SMRAM in a stack-like fashion beginning at the top of the SMRAM space. This is referred to as the processor state dump, context switch or state save. Upon completion of the state save sequence, execution of the SMI handler will then begin. The CPU asserts the SMIACT# output to indicate to the memory controller that it is operating in SMM. The system logic should be ensured that only this area is being accessed by the CPU and SMI handler.

No existing system has allowed the system core to use FLUSH# for flushing a CPU-on-chip cache and a secondary cache both in the standard mode and the SMM. This is because the dual mode machines are previously not using write-back ways at the occasion of cache flush. But it is assumed that co-existence of dual mode and the write-back ways will upgrade the performance of personal computers, thus the cache flush problems with write-back and SMM has to be solved.

The request for cache flushing is frequently made when the CPU wants to switch the mode. Without any special effort, it is likely that the data consistency between the secondary cache and the main memory is violated, since SMIACT# is generated from the CPU almost at the same time with the actual cache flushing operation. This means that if SMIACT# is already generated and the system core has changed its memory bank one from the other (eg. SMRAM to standard RAM), the write-back from the cache memory will be made into wrong memory which the content of the cache memory did not originally belong.

SUMMARY OF THE INVENTION

Accordingly, it is one object of this invention to provide an efficient mechanism to achieve a cache flush not violating write-back cycles or no need to pay attention to the timings between the flush operation and the write-back cycles.

It is another object of the invention to perform flush cycle not initiated by the CPU, or more specifically, initiated by the system core.

It is another object of this invention to provide an efficient mechanism to achieve a cache flush in a system having dual mode such as standard mode and system management mode.

It is another object of this invention to provide a cache flush mechanism fully compatible to Intel x86 CPU's bus interface, which the system core does not have to pay attention to the timings between the cache flush operation and the write-back cycles.

In one aspect of the invention, a signal generated by secondary cache to the CPU requesting to obtain the ownership of the bus to start cache flushing is provided into the system.

In another aspect of this invention, the SMIACT# signal is interrupted by the secondary cache to prevent the system core from detecting a change in the SMIACT# signal until a cache flush is completed. When SMIACT# is generated by CPU and it is detected by the system core, the system core switches the memory bank for the cache memory to write back, resulting into violating memory consistency between the cache and main memory. But this invention just interrupts the SMIACT# to reach to the system core before the cache flushing is over, assuring the content of the cache memory to be written back to a correct memory bank where the data originally resided, since the system core believes that the mode has not yet been switched through the CPU actually generated SMIACT#.

EMBODIMENTS

Figure 1:
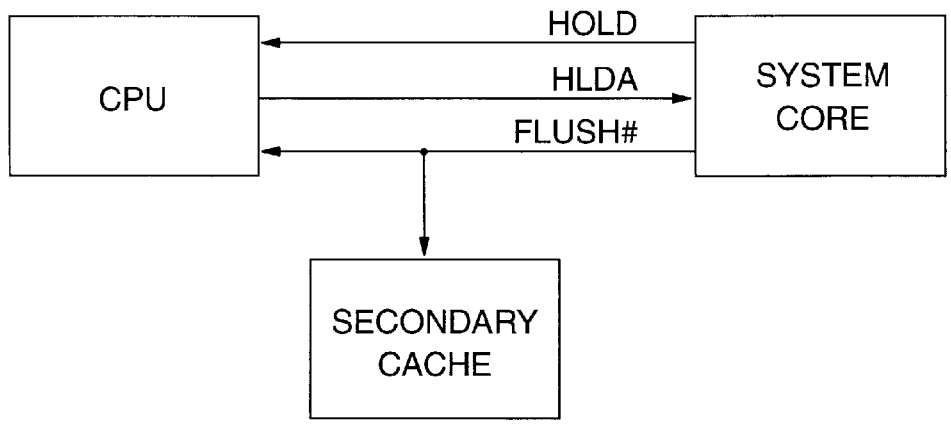
FIG. 1 is a memory system commonly implemented in a prior art.
Figure 2:
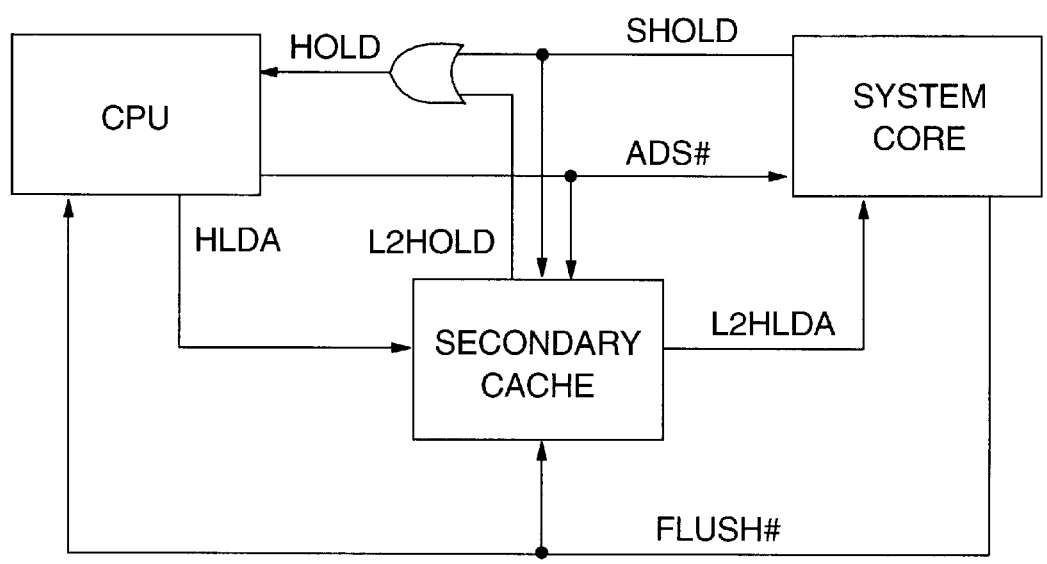
FIG. 2 is a schematic diagram of the memory system of first embodiment of the present invention.

One embodiment of this invention is implemented as shown in FIG. 2. The system includes a CPU, a system core, and a secondary cache connected to both of the CPU and the secondary cache. In this embodiment of the invention, the HOLD and HLDA signals are controlled to achieve a cache flush. When the secondary cache starts flushing, it asserts L2HOLD, which is ORed with SHOLD which is being an output from the system core. The secondary cache receives HLDA from the CPU and passes it to the system core as L2HLDA. The HOLD and HLDA are signals having same function mentioned in the background. The HOLD requests the CPU to release the bus, but in this invention, the HOLD is created by SHOLD and L2HOLD ORed. This means that the secondary cache can make a request of releasing the bus to the CPU by asserting L2HOLD, as well as the system core by using SAHOLD. Typically, the system core asserts the SAHOLD when it wants to use bus for snooping, or to detect the consistency between the cache memories and the main memory. The HLDA is a permission from the CPU that the secondary cache can obtain the bus. On contrary to FIG. 1, the secondary cache can detect this permission prior to the system core, since HLDA is interrupted by the secondary cache. This means that bus request from the secondary cache is superior to that from the system core, which enables the write-back cycles to start right after the permission has made.

Figure 3:
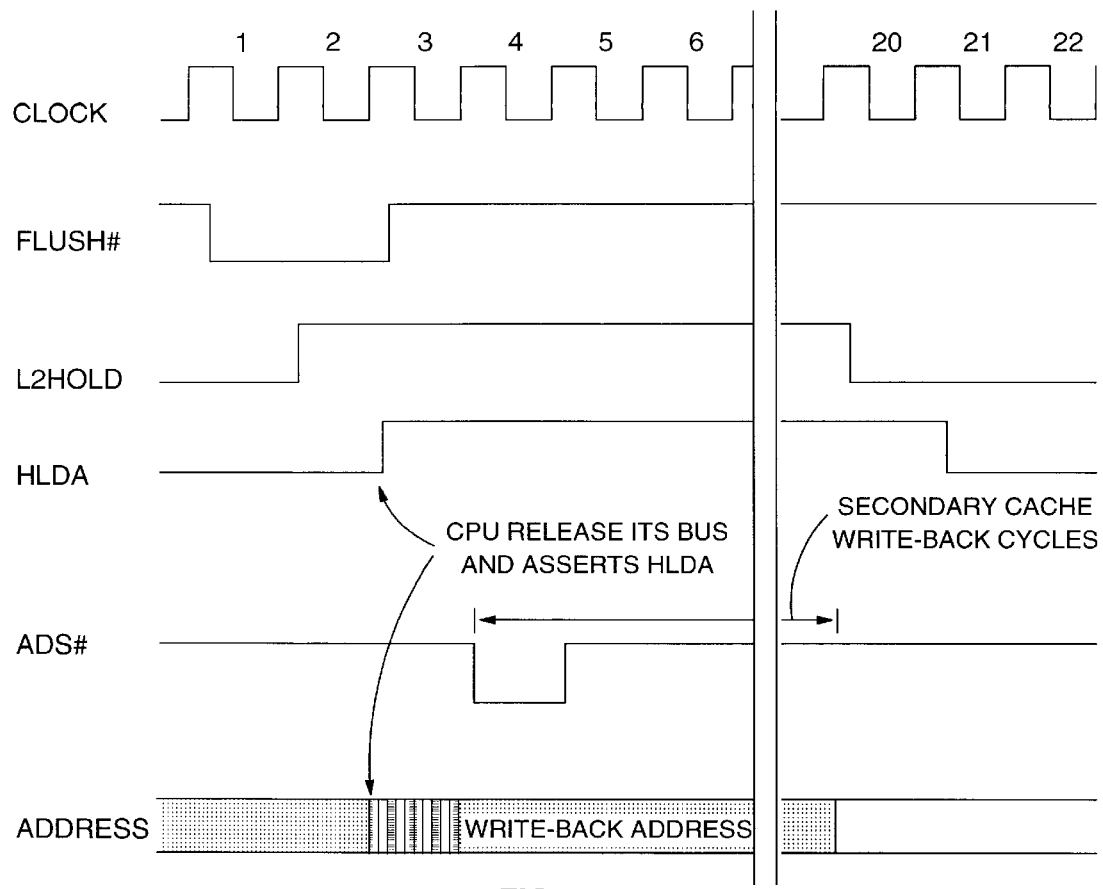
FIG. 3 is a signal timing chart of the memory system shown in FIG. 2.

The flush operation is well described by referring to the timing chart shown in FIG. 3. In cycle 1, the system core asserts FLUSH# to be low, which is a request from the system core to start flush operation. The secondary cache detects the FLUSH# at the end of cycle 1 thus driving L2HOLD high in cycle 2. The L2HOLD is ORed with SHOLD to be the output being fed to the CPU as a HOLD forcing the CPU to float the CPU bus. When the CPU releases the bus, HLDA is asserted to be high in cycle 3, and the secondary cache starts write-back cycles from the beginning of cycle 4, by detecting the HLDA being high. The HLDA being high is taken as a permission of the CPU to the secondary cache to start it's operation, since the bus had been released by the CPU. At cycle 20, the secondary cache finishes the write-back cycles, and deasserts the L2HOLD resulting the HOLD to be low. This will let the CPU deassert HLDA in cycle 21 for the secondary cache to receive this signal and to pass it to the system core as L2HLDA.

It should be noted, however, that the CPU does not always release the bus at the cycle immediately subsequent to the cycle which the HOLD is asserted. The CPU will only release the bus when it's outstanding task finishes at a certain cycle. So in FIG. 3, the CPU happened to be not performing a task that hangs on after cycle 3. But if the CPU had been processing something history-sensitive, it would have continued its task till it had been finished, and then assert HLDA high probably in cycle 10 or 100. The decision of whether the CPU should pass the bus immediately to the secondary cache for flush operation, or the CPU should continue its task till it is over depends solely on the CPU. In this manner, a proper write-back cycle can achieved even though the CPU was doing something history sensitive, solving one of the primary problems the prior art had.

This mechanism can prevent the system core from accidentally starting snooping operations since the HLDA is interrupted by the secondary cache, resulting in the L2HLDA being kept low during the write-back cycles. The snooping can start only after the system core knows the L2HLDA is asserted by the secondary cache, which means that the write-back cycles have finished. In this manner, the secondary cache can initiatively start its write-back operation upon flush request, thus solving another one of the problems prior art had.

Another embodiment of this invention is performed in a system operating in dual modes, such as standard mode and system management mode. Things are more complicated when dual modes are available in a system, since secondary cache has to write back to the correct physical memory exactly in correspondence with the current operating mode. That is, in more detail, on occasion of cache flush during the standard mode, the write-back has to be made to the standard RAM, not to the system management RAM (SMRAM). If a write-back is made to the SMRAM in the standard mode by mistake, the data consistency will be violated. In other words, if the cache flush was performed during the system management mode (SSM), the write-back has to be made to the SMRAM, not to the standard RAM.

Again, if the write-back was made to the standard RAM by mistake, the data consistency will be violated.

In this embodiment, the mentioned objects of this invention are achieved by controlling AHOLD, BOFF# and SMIACT# signals. Signal lines connect components of the system as shown in the FIG. 4. The secondary cache can drive L2AHOLD and L2BOFF# which is ORed and invertedly ORed to SAHOLD and inverted BOFF# respectively, both being outputs from the system core.

When system core wants to perform the flush operation, the system core asserts FLUSH# low, which is also detected by the secondary cache and forces it to assert L2AHOLD high, forcing the CPU to float its address bus and to prevent the CPU from getting into subsequent tasks consuming a certain range of bus cycles. But as mentioned in the previous embodiment, if the CPU was performing a history-sensitive task, the CPU does not have to give up the bus right after the secondary cache asserted the L2AHOLD.

Figure 4:
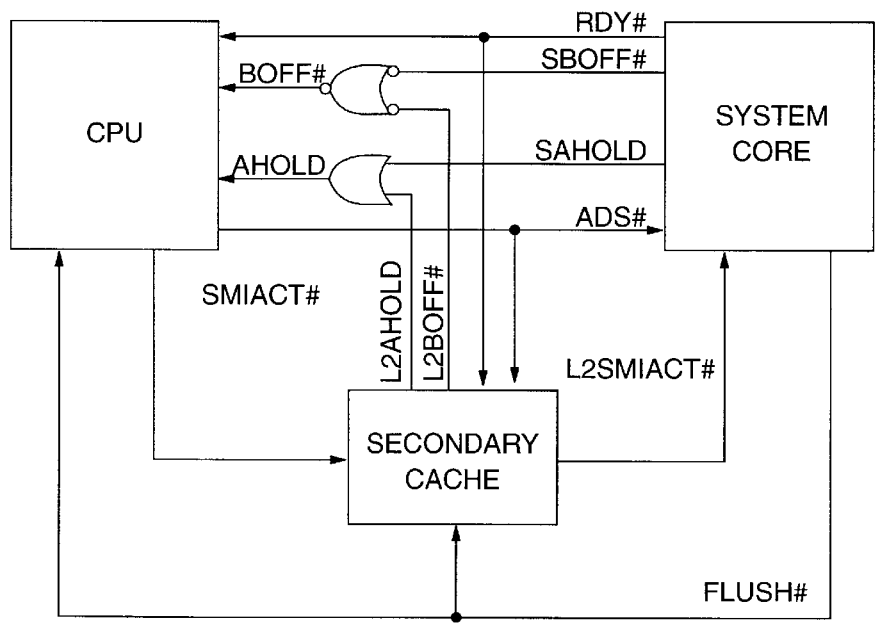
FIG. 4 is a schematic diagram of the memory system of second embodiment of the present invention.

The secondary cache maintains L2SMIACT# at its level despite of the CPU driving SMIACT# low. This prevents the system core from switching the memory bank from the standard memory to the SMRAM, ensuring the data to be written back to a correct memory which it belongs. In other words, when dual mode operation is applied to a system, SMIACT# is the signal to change one mode into another, and if the change of SMIACT# were directly transferred to the system core, system core assumes that the operation mode has been changed and switches the memory bank, resulting into writing back into a wrong memory. This occurs if the SMIACT# is directly transferred to the system core without any control by the secondary cache. So, as shown in FIG. 4, the SMIACT# is intercepted by the secondary cache, to make the system core believe that the mode has not yet been changed by maintaining the L2SMIACT# at the same level. By this way, system core considers that the mode has not yet been changed, thus not switching the memory bank, and the data in the secondary cache will be successfully written back to the standard RAM, achieving consistency of the data.

This mechanism will follow either one of two scenarios.
  (i) The CPU asserts ADS# not at the same time with secondary cache asserts L2AHOLD, or
  (ii) The CPU asserts ADS# at the same time with L2AHOLD assertion. The ADS# is a signal generated by the CPU, the secondary cache and the system core, appealing to the other components of the system to request the bus. When the CPU was not intending to use the bus at the timing that the secondary cache wanted to start write-back operation, which means that ADS# is not asserted at the same time with L2AHOLD, then follows scenario 1. When the CPU intended to use the bus at the same timing with the secondary cache intending to start write-back cycles, which means that ADS# is being asserted at the same time with L2AHOLD, then follows scenario 2. In other words, scenario 2 is the case that two bus access requests from the CPU and the secondary cache conflicts.

Figure 5:
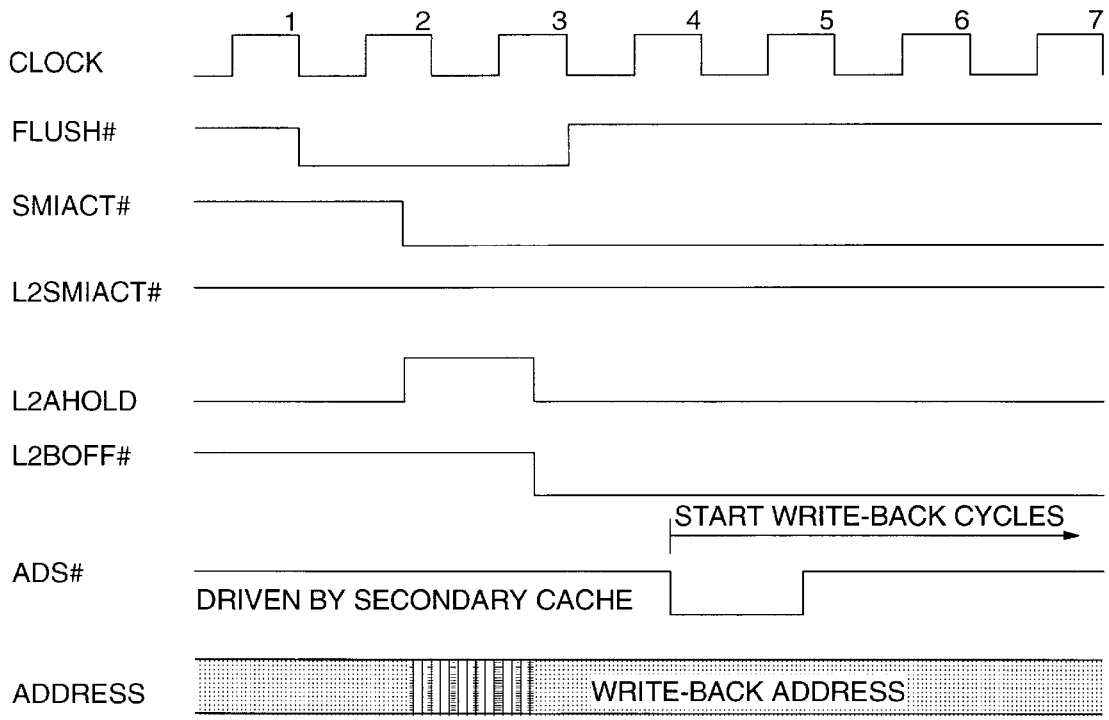
FIG. 5 is a signal timing chart of the memory system shown in FIG. 4, when the bus access from the CPU and the secondary cache is not conflicted.

As for scenario 1, the timing chart is hereby shown in FIG. 5.
  a) The system core asserts FLUSH# in cycle 1. This is the notice of system core to the CPU to start flush operation. The FLUSH# is also detected by the secondary cache at the end of cycle 1.
  b) When the secondary cache detects the FLUSH# being low, it drives L2AHOLD high in cycle 2 to make the CPU float the address bus in the next cycle. L2AHOLD is ORed with SAHOLD and fed to the CPU as AHOLD.
  c) If the CPU does not start the next bus cycle, then the write-back operation can be started. This is detected by the stated ADS#. If the CPU does not drive ADS# low simultaneously with AHOLD in cycle 2, the secondary cache assumes that the write-back cycles can be started since the CPU is not using the bus, thus driving L2BOFF# low in cycle 3.

d) Then the secondary cache successfully starts the write-back cycles in cycle 4 (ADS# driven by secondary cache).

e) It should be noted that though the SMIACT# is asserted low in cycle 2, the secondary cache doe snot assert the L2SMIACT# low in correspondence. This shows that the write-back operation can be achieved to an appropriate memory, even if the mode has been changed. Speaking more into detail, the FLUSH# is asserted by the system core when it wants to change the operation mode. This signal makes the CPU assert SMIACT# low in the subsequent cycle, which informs of the change of the operation mode to the secondary cache. The secondary cache will start its write-back cycle as soon as it is confirmed that the CPU cycles are over, which are shown in step (a) to (d), but since the change of the operation mode is not informed to the system core, by the secondary cache not asserting L2SMIACT# low at this stage, the system core does not switch the memory bank to be written-back. This results in the secondary cache writing back to the original memory bank that the information was originally resident or to the memory bank that the CPU intended the information to be stored. This deferred switching of SMIACT# to L2SMIACT# is the key of this invention, in aspect of applying write-back cycle in dual operation mode system.

Also, by making operation as described, it is guaranteed that the CPU will not drive ADS# low in cycle 3, since AHOLD is active in the previous cycle.

Figure 6:
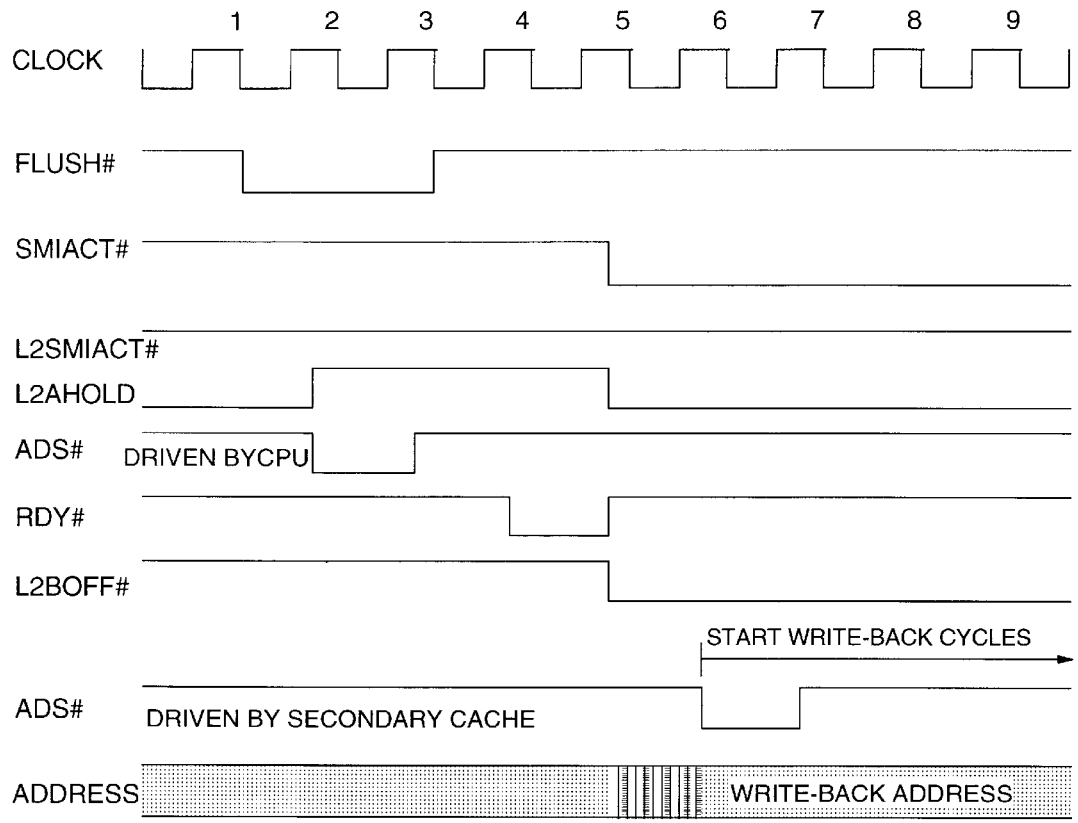
FIG. 6 is another signal timing chart of the memory system shown in FIG. 4, when the bus access from the CPU and the secondary cache is conflicted.
Figure 7:
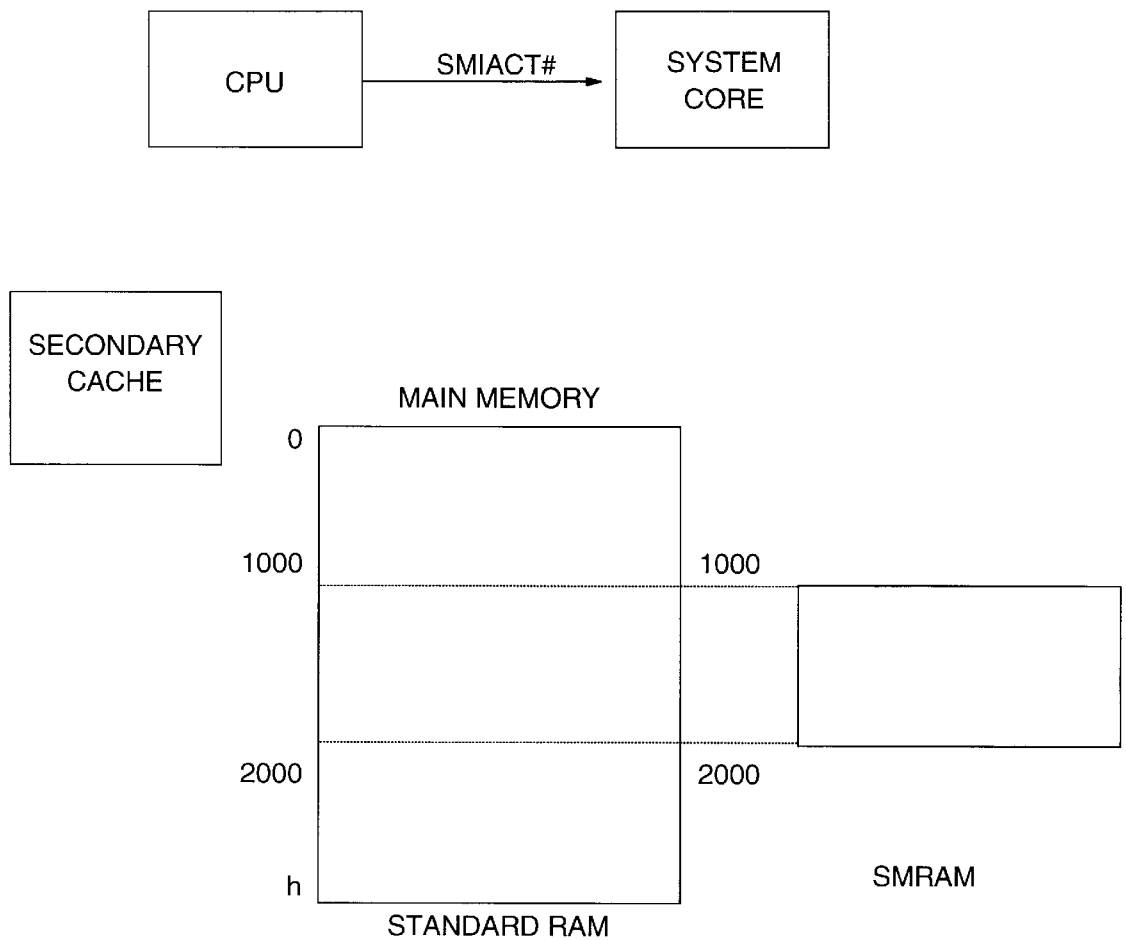
FIG. 7 is a schematic diagram of dual-mode memory system for explanatory purpose.

As for the scenario 2, which is the case that two bus requests from the CPU and the secondary cache are conflicting, the operation should be modified to scenario 2 as described as follows, as well as shown in FIG. 6. As mentioned, this is the case that ADS#, which is a bus request signal from the CPU, and the AHOLD, which is the bus request from either the secondary cache or the system core, are simultaneously asserted.

The first two steps are the same, which are:

a) The system core asserts FLUSH# in cycle 1. This is the notice of system core to the CPU to start flush operation. The FLUSH# is also detected by the secondary cache at the end of cycle 1.

b) When the secondary cache detects the FLUSH# being low, it drives L2AHOLD high in cycle 2 to make the CPU float the address bus in the next cycle. L2AHOLD is ORed with SAHOLD and fed to the CPU as AHOLD, appealing to the CPU of the secondary cache willing to occupy the bus for write-back cycles.

But in this scenario, the ADS# is happened to be asserted simultaneously with the AHOLD, which is distinctive from the case in scenario 1, thus the modified steps come, which are:

c) The CPU drives ADS# low simultaneously with the AHOLD being high in cycle 2. The AHOLD is kept high until RDY# becomes low, which shows that the CPU is finished with the current task using the bus. It shall be noticed, that RDYπ indicates the end of the CPU occupying the bus.

d) When the secondary cache detects the RDY# being low at the end of cycle 4, the AHOLD is being dropped at the same time with BOFF#.

e) Then the secondary cache successfully starts the write-back cycles in cycle 4 (WBADS#). As for the relationship between the SMIACT# and the L2SMIACT#, it is just the same as scenario 1.

By making operation as described, it is guaranteed that the CPU will not drive ADS# low in cycle 5, because AHOLD is active in cycle 4. It should be noted that though this embodiment is referred in accordance with dual mode system, this can be also applied to a single mode system.

While embodiments of this invention that have been described are the preferred implementations, those skilled in the art will understand that variations therefor may also be possible. Therefore, the invention is entitled to protection within the full scope of the claims.

We claim:

1. A computer memory system having a CPU, a system core and a cache memory connected to said CPU and said system core via bus, comprising:

a first signal means generated by said system core to said CPU and said cache memory to flush the content of said cache memory;

a second signal means generated by said cache memory to said CPU in response to said first signal means for requesting said CPU to release said bus;

a third signal means generated by said CPU to said cache in response to said second signal means to inform said cache memory that CPU has released said bus, said third signal not being passed to said system core such that said cache detects that said CPU has released the bus prior to the system core; and a fourth signal means generated by said cache memory to said system core after said cache memory finishes a flush operation.

2. A computer system of claim 1 wherein said second signal means is ORed with a fifth signal means generated by said system core for requesting said CPU to release said bus.

3. A computer system of claim 2 wherein said fifth signal means is also fed to said cache memory.

4. A method for cache flushing a computer memory system having a CPU, a system core, a cache memory connected to said CPU and said system core via bus, and a signal line enabled by any one of said CPU, said system core or said cache memory indicating request for said bus, said memory system operating in a plurality of modes using a plurality of physically distinct main memory spaces respectively having a common logical address in at least a portion of a whole logical address region, comprising the steps of:

said system core generating a first signal means to said CPU and said cache memory to flush the content of said cache memory;

said cache memory generating a second signal to said CPU in response to said first signal means for requesting said CPU to release said bus;

said CPU generating a third signal means to said cache memory only requesting that said memory system be switched to a different mode;

said cache memory generating a fourth signal means to said system core requesting that said mode be switched;

wherein said fourth signal means is generated after flushing of said cache memory has been completed such that said cache prevents said CPU from switching said mode until flushing of said cache memory has been completed.

5. A method for cache flushing in a computer memory system having a CPU, a system core, a cache memory connected to said CPU and said system core via bus, and a signal line enabled by any one of said CPU, said system core or said cache memory indicating request for said bus, said memory system operating in a plurality of modes using a plurality of physically distinct main memory spaces respectively having a common logical address in at least a portion of a whole logical address region, comprising the steps of:

said system core generating a first signal for requesting said mode to be changed from a first mode to a second mode;

said cache memory generating a second signal requesting said CPU to release said bus in response to said first signal;

said CPU generating a third signal for switching said mode in response to said second signal wherein said third signal is interrupted by said cache memory to prevent the system core from detecting said third signal until after said cache memory has completed cache flushing said that said cache prevents said CPU from switching said mode until flushing of said cache memory has been completed.

6. A method for cache flushing in a computer memory system of claim 5 further comprising the step of said CPU releasing said bus after it has completed its current task.

7. A method for cache flushing in a computer memory system of claim 6 wherein said CPU does not generate said third signal prior to said CPU releasing said bus.

8. A computer memory system having a CPU, a system core, a cache memory connected to said CPU and said system core via bus, said memory system operating in a plurality of modes using a plurality of physically distinct main memory spaces respectively having a common logical address in at least a portion of a whole logical address region, wherein a signal generated from said CPU requesting that said mode be switched is interrupted by said cache memory, to prevent said system core from detecting said signal until after said cache memory has completed cache flushing such that said cache prevents said CPU from switching said mode until flushing of said cache memory has been completed.

9. A computer memory system claimed in claim 8, wherein said cache system writes back the content of said cache memory to a main memory which is accessed in the prior mode that the memory system used to be before mode switching.

* * * * *